(12) United States Patent
Ainslie et al.

(10) Patent No.: US 6,480,599 B1
(45) Date of Patent: Nov. 12, 2002

(54) TELECOMMUNICATIONS SYSTEM AND METHOD FOR AUTOMATIC CALL RECOGNITION AND DISTRIBUTION

(75) Inventors: Gordon D. Ainslie, Victoria (AU); Christopher Sheahan, Victoria (AU)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 09/214,499

(22) PCT Filed: Sep. 3, 1997

(86) PCT No.: PCT/AU97/00571

§ 371 (c)(1), (2), (4) Date: Mar. 30, 1999

(87) PCT Pub. No.: WO98/10574

PCT Pub. Date: Mar. 12, 1998

(30) Foreign Application Priority Data

Sep. 4, 1996 (AU) ................................................ PO2140

(51) Int. Cl.[7] .............................. H04M 3/00; H04M 5/00
(52) U.S. Cl. ............................... 379/265.02; 379/220.01
(58) Field of Search ........................ 379/265.01–265.14, 379/266.01–266.1, 309, 219, 220.01, 221.01–221.15, 207.01–207.16, 52, 88.01–88.03, 93.01; 370/270

(56) References Cited

U.S. PATENT DOCUMENTS

| | | | |
|---|---|---|---|
| 4,420,656 A | 12/1983 | Freeman | 379/73 |
| 4,591,664 A | 5/1986 | Freeman | 379/73 |
| 5,125,024 A | 6/1992 | Gokcen et al. | 379/88.01 |
| 5,164,981 A | 11/1992 | Mitchell et al. | 379/88.01 |
| 5,199,062 A | 3/1993 | Von Meister et al. | 379/88.04 |
| 5,247,568 A | 9/1993 | Bergsman et al. | 379/88.23 |
| 5,345,501 A | 9/1994 | Shelton | 379/88.2 |
| 5,428,679 A * | 6/1995 | French | 379/201.04 |
| 5,450,470 A * | 9/1995 | Alheim | 379/52 |
| 5,533,115 A * | 7/1996 | Hollenbach et al. | 379/221.09 |
| 5,659,605 A * | 8/1997 | Voit et al. | 379/243 |
| 5,703,935 A * | 12/1997 | Raissyan et al. | 379/88.18 |
| 5,740,240 A * | 4/1998 | Jolissaint | 379/265.02 |
| 5,742,675 A * | 4/1998 | Kilander et al. | 379/266.09 |
| 5,918,213 A * | 6/1999 | Bernard et al. | 705/26 |
| 5,923,745 A * | 7/1999 | Hurd | 379/220 |
| 5,946,387 A * | 8/1999 | Miloslavsky | 379/265 |
| 6,002,749 A * | 12/1999 | Hansen et al. | 379/52 |
| 6,014,439 A * | 1/2000 | Walker et al. | 379/266 |
| 6,185,287 B1 * | 2/2001 | Miloslavsky | 379/219 |

FOREIGN PATENT DOCUMENTS

DE          3422409 A1    12/1985

\* cited by examiner

*Primary Examiner*—Benny Q. Tieu
(74) *Attorney, Agent, or Firm*—Nixon & Vanderhye

(57) ABSTRACT

A telecommunications system connects callers in a telecommunications network to call destinations and provides different services. A telephone call receiving node includes an interactive response unit adapted to interrogate a caller to determine caller and service information identifying the caller and the type of service required by the caller, and adapted to determine an appropriate call destination for each call. A call processing center is adapted to communicate remotely with the call receiving node and arranged to receive and process the caller and service information received from the call receiving node, and to connect a telephone call received from the call receiving node to an appropriate call destination for the service required as determined by the processing of the received caller and service information.

21 Claims, 10 Drawing Sheets

TELECOMMUNICATIONS SYSTEM AND METHOD FOR AUTOMATIC CALL RECOGNITION AND DISTRIBUTION

FIELD OF THE INVENTION

This invention relates to a telecommunications system and method for automatic call recognition and distribution and, more particularly, to a telecommunications system and method for connecting subscribers to one of a plurality of service providers.

BACKGROUND AND SUMMARY OF THE INVENTION

For large service providers that have branches/centers that are distributed and remote from each other, and having telephone numbers pertaining to particular services in different locations, it is difficult for a customer to be connected with a service requested by the customer through a single telephone call by the customer to the service provider. Often, the customer has to make several calls to get to the particular service requested, leading to customer dissatisfaction and inefficient call handling, thereby increasing costs to the customer.

Automatic Call Distribution (ACD) systems are known and used by service and marketing companies. An incoming call from a customer may be distributed by the ACD system among a number of call handling agents in the event that simultaneous calls are received from a plurality of customers. The call is simply directed to an agent's workstation that is available to accept the call. Such ACD systems generally are only capable of distributing an incoming call at one particular site. They do not have the capability to transfer calls to another site should a different service be requested or an agent with more experience be required to handle the call, the agent being remotely located from the site at which the original call was received.

Also known are systems that use interactive voice response (IVR) procedures to determine information about a customer and a particular service required. Specifically, when a customer calls a service provider he or she will be greeted with a recorded voice message offering a number of options as to what service the customer wishes to be connected with. The customer responds by pressing any number of digits of a touch telephone that uses dual tone modulation frequency (DTMF). Depending on the responses of the customer, the system then directs the call to connect it with the service. However, a disadvantage with such a system is that the customer requires access to a DTMF telephone to respond to the voice prompts. There are many decadic dialling telephones still in use today and for customers having such telephones, the IVR procedures are of limited benefit.

It is therefore desirable to provide a system in which customers having such decadic dialling telephones may use IVR to be connected with a service. Such a system may use Automatic Speech Recognition (ASR), wherein ASR is used in conjunction with IVR so that a customer can be directed through the telecommunications system to the appropriate service.

It is also desirable to provide a system which allows customers access to services of different service providers on one call initiated by the customer.

The present invention provides for a telecommunications system and method that allows a customer to be connected to a service of a plurality of service providers in a more efficient and cost effective manner than previously known systems.

According to one aspect of the invention, there is provided a telecommunications system for connecting callers in a telecommunications network to a plurality of call destinations providing different services for the callers, comprising:

call receiving means to receive telephone calls from users, said call receiving means including
interactive response means adapted to interrogate a caller to determine caller and service information identifying the caller and the type of service required by the caller, and adapted to determine an appropriate call destination for each call; and
a remotely located call processing center adapted to communicate remotely with the call receiving means and arranged to receive and process the caller and service information received from said call receiving means thereby acting to liberate the call receiving means for other incoming telephone calls while the call processing center, connects a telephone call received from the call receiving means to an appropriate call destination for the service required by the caller as determined by the processing of said received caller and service information.

According to a second aspect of the present invention, there is provided a method for connecting a caller in a telecommunications system to one of a plurality of call destinations providing different services, said method comprising the steps of:

receiving an incoming telephone call from a caller;
interrogating the caller by interactive response procedures to determine caller and service information about the caller, such as the caller's identity and the type of service required by the caller;
sending the caller and service information to a remotely located call processing center;
receiving and processing the caller and service information at the call processing center thereby acting to liberate the call receiving means for other incoming telephone calls; and
connecting the call to an appropriate call destination in accordance with the processing of said received caller and service information.

Preferably, the call processing center includes automatic call distribution means adapted to transfer telephone calls received from the call receiving means to appropriate call handling agents of a service provider as determined by the processing of said received caller and service information.

The call processing center preferably includes, or is in communication with, at least one customer information database, associated with a service provider, containing information about customers of the service provider, and the call processing center is arranged to retrieve information about a customer from the customer information database, e.g. for display on a visual display unit at a workstation of a call handling agent of said service provider, prior to or simultaneously with the call processing center forwarding the telephone call to said agent.

The call receiving means preferably includes, or is adapted to communicate with, a customer service database containing service data identifying the services of particular service providers, which services are available to be accessed from the call processing center.

The interactive response means of the call receiving means is conveniently arranged to communicate with the customer service database when interrogating a caller to determine whether or not the type of service required by the caller is available to be accessed from the call processing center.

The data and information identifying the caller and service information is preferably sent from the call receiving means to the remote call processing center over a telecommunications network. The information may be sent in the form of data signals using standard or proprietary telecommunications signalling procedures.

As used herein, the term interactive response means encompasses any type of interactive response application which is able to interrogate a caller by question and answer procedures.

The interactive response means may, for instance, comprise an interactive response device which recognizes text messages generated by a teletypewriter (TTY) and which provides response messages using TTY codes.

In an alternative preferred embodiment, the interactive response means comprises interactive voice response means containing pre-stored voice response messages and internal programs for generating appropriate voice response messages to interrogate a caller.

The interactive voice response means may, for example, be arranged to recognize dual tone modulation frequency (DTMF) coded messages produced by a touch telephone in reply to pre-recorded voice questions generated by the interactive voice response means.

In a particularly preferred embodiment, the call receiving means further includes automatic speech recognition means arranged to recognize a caller's speech replies to the interactive voice response means.

Preferably, the voice response messages are generated by the interactive voice response means in response to the voice replies from the caller which are recognized by the speech recognition means.

According to a third aspect of the present invention, there is provided a telecommunications apparatus comprising:
call receiving means to receive telephone calls from callers; said call receiving means including
  (i) interactive voice response means adapted to interrogate a caller to determine caller and service information identifying the caller and the type of service required by the caller;
  (ii) automatic speech recognition means arranged to recognize a caller's speech responses to the interactive voice response means; and
  (iii) interface means adapted to communicate with a remotely located call processing center for providing said caller and service information to said call processing center thereby acting to liberate the call receiving means for other incoming telephone calls.

The call processing center may be connected to a plurality of call handling agents and arranged to connect a telephone call received from the call receiving means to an appropriate call handling agents for the service required by the caller.

According to a fourth aspect of the present invention, there is provided a method for connecting a caller in a telecommunications system to one of a plurality of call destinations providing different services, said method comprising the steps of:
  receiving an incoming telephone call from a caller;
  interrogating the caller by interactive voice response procedures using automatic speech recognition to determine information about the caller, such as the caller's identity and the type of service required by the caller;
  sending the caller and service information to a remotely located call processing center;
  receiving and processing the information at the call processing center thereby acting to liberate the call receiving means for other incoming calls; and
  connecting the call to an appropriate call destination in accordance with the processing of said received caller and service information.

In the apparatus and method of the third and fourth aspects of the invention, the call receiving means for receiving incoming calls is preferably connected to a customer service computer.

The customer service computer preferably contains a database of service data identifying the services of a plurality of service providers. The customer service computer may also contain automatic speech recognition programs and/or interactive voice response programs and messages which correspond to particular services available to be accessed in the system and which can be downloaded to the call receiving means. The customer service computer may also contain information about services which can enable the call receiving means to handle service requests from callers without having to transfer the calls to a remote call processing center or remote call handling agents.

In a particularly preferred embodiment, the customer service computer is located remotely from the call receiving means so that the automatic speech recognition programs and/or the interactive voice response programs and messages used at the call receiving means can be remotely loaded and remotely updated and adjusted from the customer service computer. The call receiving means may communicate with the remotely located customer service computer by any convenient datalink, such as a switched broadband access link.

BRIEF DESCRIPTION OF THE DRAWINGS

A preferred embodiment of the invention will now be described, by way of example only, with reference to the accompanying drawings wherein.

DETAILED DESCRIPTION

Figure 1:
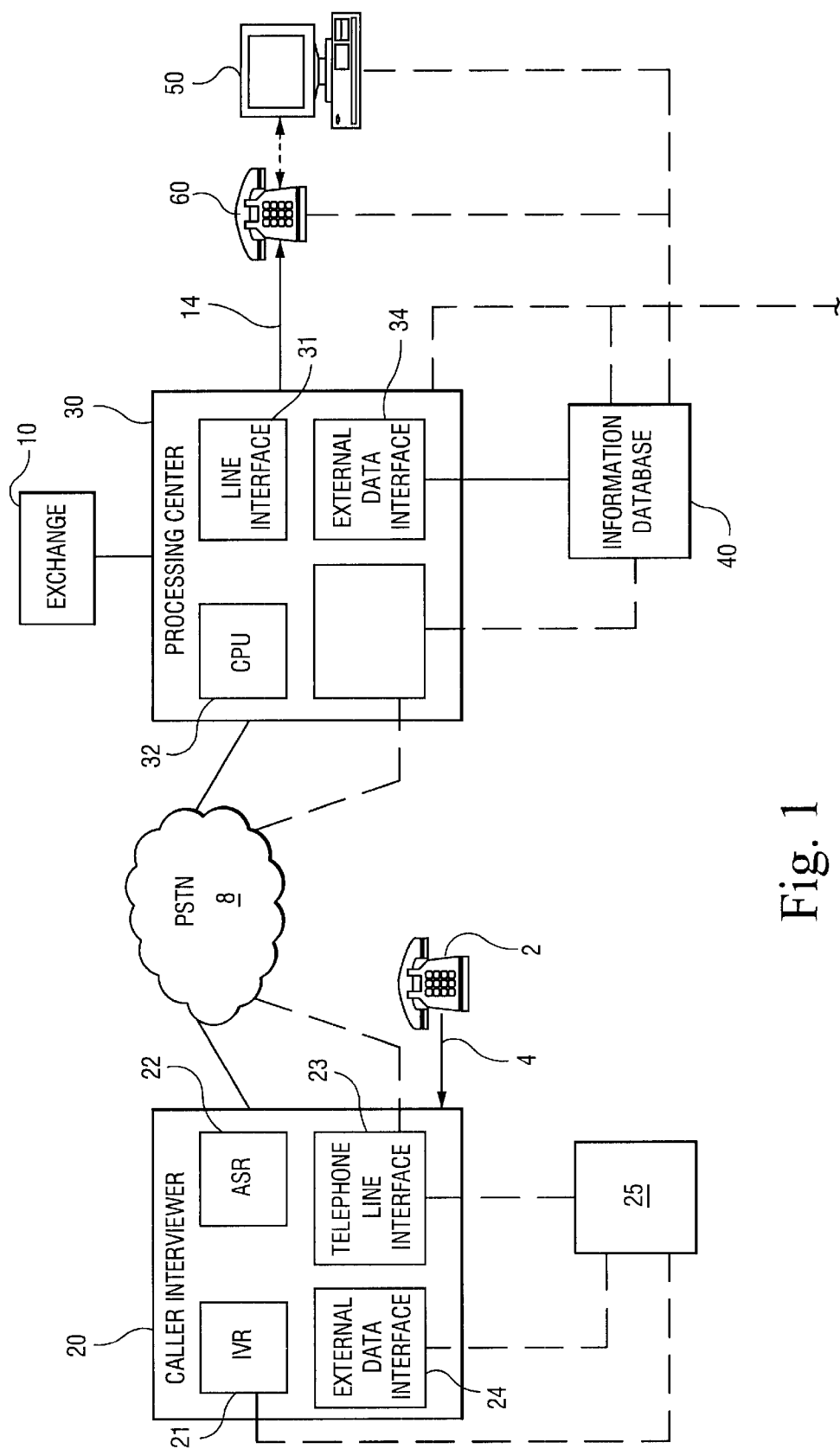
FIG. 1 is a schematic block diagram of a telecommunications system in accordance with the invention.

Referring to FIG. 1, a telecommunications system includes a "caller interviewer" 20 for receiving telephone calls or "queries" for subscriber services from telephones of customers and for interrogating callers, a call processing center or "call director" 30 remotely located from the caller interviewer 20 and one or more information databases 40 in which details relating to individual customers are stored. The call receiving means 20 has interactive voice response (IVR) means 21, automatic speech recognition (ASR) means 22, a telephone line interface 23 and an external data interface 24.

An incoming call on a telephone line 4 from the telephone 2 of a customer requiring to be connected to a service is received by the line interface 22 and passed to the IVR means 21. The IVR means 21 interrogates the customer through a series of voice prompts, and the customer responds by voice which is recognized by the automatic speech recognition means 22 so as to determine the identity of the customer and nature of the query of the customer.

Connected to the caller interviewer 20 through link 6 is a customer service database 25 which stores details, such as telephone numbers, representing multiple services of respective service providers. The database 25 is accessed by caller interviewer 20 in order to locate the relevant telephone number which corresponds to the particular service requested by the customer. The caller interviewer 20 then dials the call processing center 30 over a telecommunications network 8. The call processing center 30 is remotely located from the call receiving means 20 and includes a line interface 31, a central processing unit (CPU) 32, and an external data interface 34. The call processing center is also connected, via the line interface 31, to telephones 60 of a plurality of call handling agents for handling queries from customers. Each call handling agent for the different service providers has a workstation or personal computer 50 connected via a local area network (LAN) communications link 45 to an information database 40 for that particular service provider. The customer identification and query type is transferred to the call processing center 30 from the caller interviewer 20, i.e. the telephone number of the customer together with any other details provided by the customer and also the number representing the query or particular service requested.

Once received by the call processing center 30 through exchange 10 and line interface 31 of center 30, the customer is put on hold while the center 30 accesses via the data interface 34 an information database 40 that retrieves all relevant details relating to that particular customer.

While the customer is still placed on hold, the CPU 32 of the call processing center 30 uses Automatic Call Distribution (ACD) to locate an appropriate available call handling agent who is able to attend to the customer's query or request. The customer information retrieved from the information database 40 is forwarded to the workstation 50 of the available call handling agent through the LAN of the service provider to be displayed on the computer screen of the agent's workstation.

The call handling agent is now in a position to ascertain relevant details of the customer either simultaneously or immediately before the call processing center 30 connects or directs the customer call to the agents telephone 60 over telephone line 14 to enable the customer to have direct voice contact with the agent.

Figure 2A:
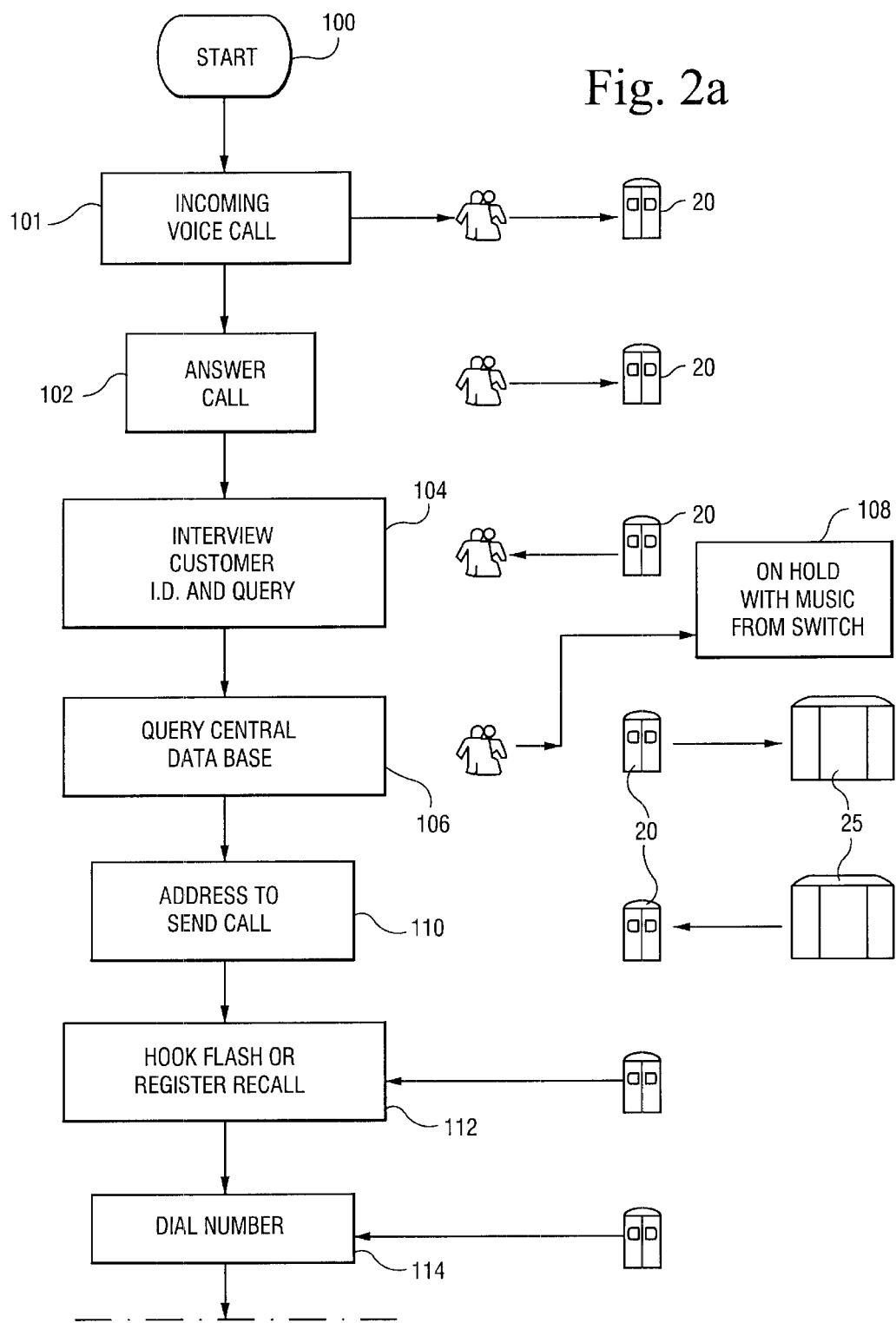
FIGS. 2a, 2b and 2c shows a flow process from a call initiated by a customer to where the customer is connected with an agent of a service provider.

Referring to FIG. 2a, a customer dials the number of the required subscriber service, e.g. to enquire about details of his bank account, through any telephone terminal 2 at step 100. The incoming call is received and answered by the caller interviewer 20 at steps 101 and 102. The caller interviewer 20 interrogates or "interviews" the customer using its interactive voice response (IVR) means 21 to find out the identification of the customer, e.g. bank account number, PIN, name, etc., and the nature of the service or query requested by the customer. The customer responds to each voice prompt from the IVR means 21 by voice which is recognized by the speech recognition means 22 and subsequently processed by the call receiving means 20. This activity takes place at step 104.

After determining the customer identification and service requested, the caller interviewer 20 issues a command at step 106 to database 25 to retrieve information, such as a telephone number, representative of the particular service of a service provider which is stored in the database 25. The database 25 may contain a large number of applications any other data pertaining to a service associated with telephone numbers of different service providers. These can be updated and loaded into the database by the particular service providers.

While the caller interviewer 20 is retrieving the information from the database 25, the customer is placed on hold at step 108 with suitable music, either pre-recorded or from a radio station, being switched to the customer's line. The IVR means 21 keeps the customer informed of what is happening from time to time.

Once the relevant information has been retrieved the address or telephone number relating to that requested service is stored in the caller interviewer 20 at step 110. The customer's call is 'hook-flashed' at step 112 and the call processing center or "call director" 30 is dialled by the caller receiving means at step 114 over the telecommunications network 8, such as the public switch telephone network (PSTN). The call director 30 answers the call at step 116. Information on the customer's identification and the service number requested is then transmitted at step 118 through the network 8 from the caller interviewer 20 to the call director 30. The information may be transmitted in any convenient manner, such as by using in-band signalling which is a proprietary signalling scheme based on DTMF.

Figure 2B:
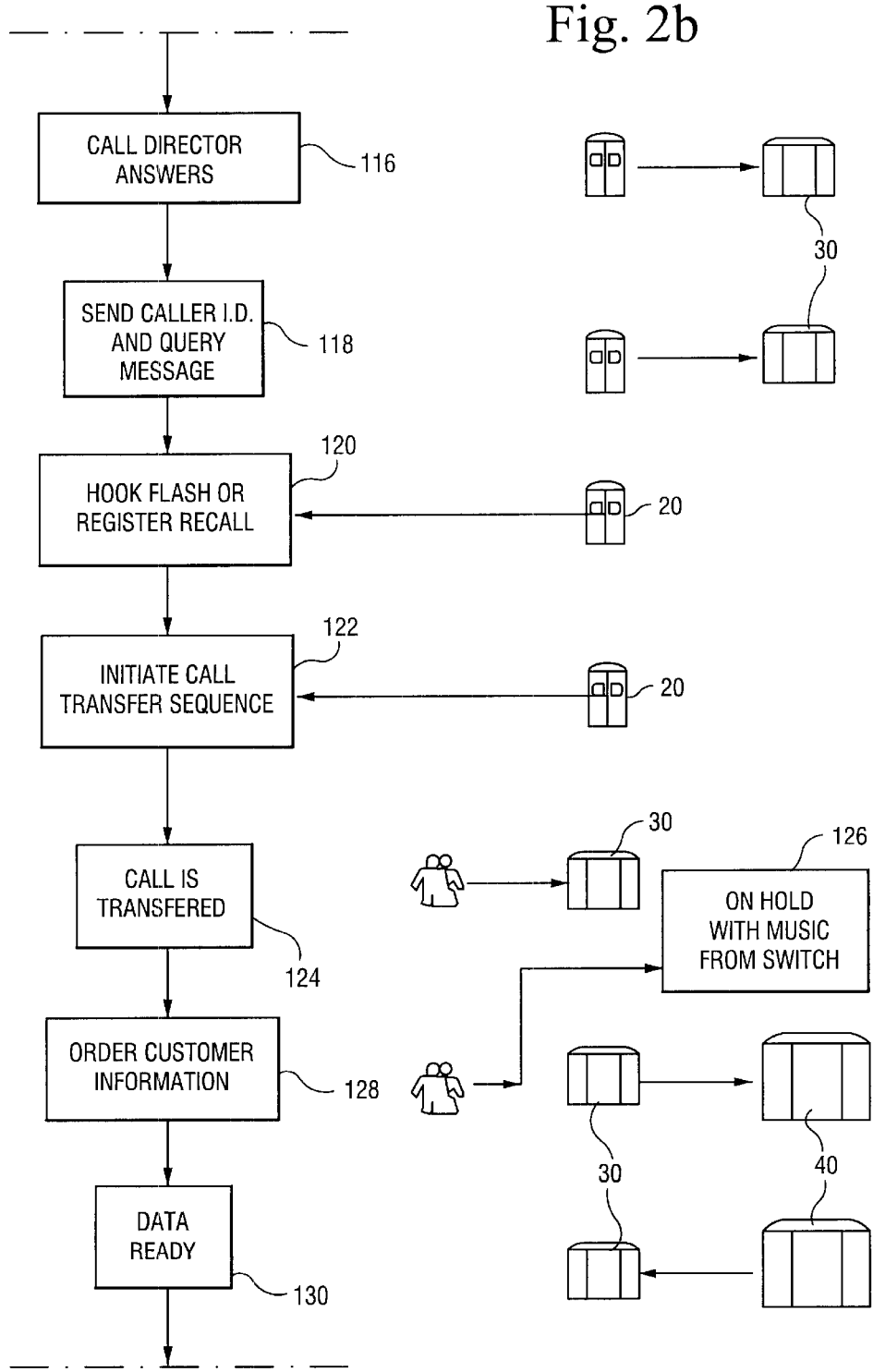

Referring to FIG. 2b, which continues from step 118 of FIG. 2a, the customer's call is 'hook-flashed' again at step 120 by the call receiving means 20 and then at step 122 the caller interviewer 20 initiates a call transfer sequence and the call is transferred at step 124 to the call director 30 and the customer is put on hold again at step 126. This holding procedure may be performed by a switch within the exchange to which the call processing center is linked. As before, music can be switched through to the customer while he or she is waiting.

At step 128, the call processing center accesses one of the information databases 40 based on the information of the customer's identification and service requested. The or each database 40 may store, for each service provider, details on its customers and when required can provide information relating to a particular service request for a particular customer. The information is then formatted such that it is able to be viewed on a visual display unit at a call handling agent's workstation 50 for the service provider.

Once the information is ready to send to the agent (step 130), the call processing center 30 uses Automatic Call Distribution (ACD) to select a call handling agent for the particular service provider who is available to accept the customer's call at step 132.

When an available call handling agent is located, the formatted customer details are sent to the agent's workstation 50 for easy reference by the agent at step 134.

Figure 2C:
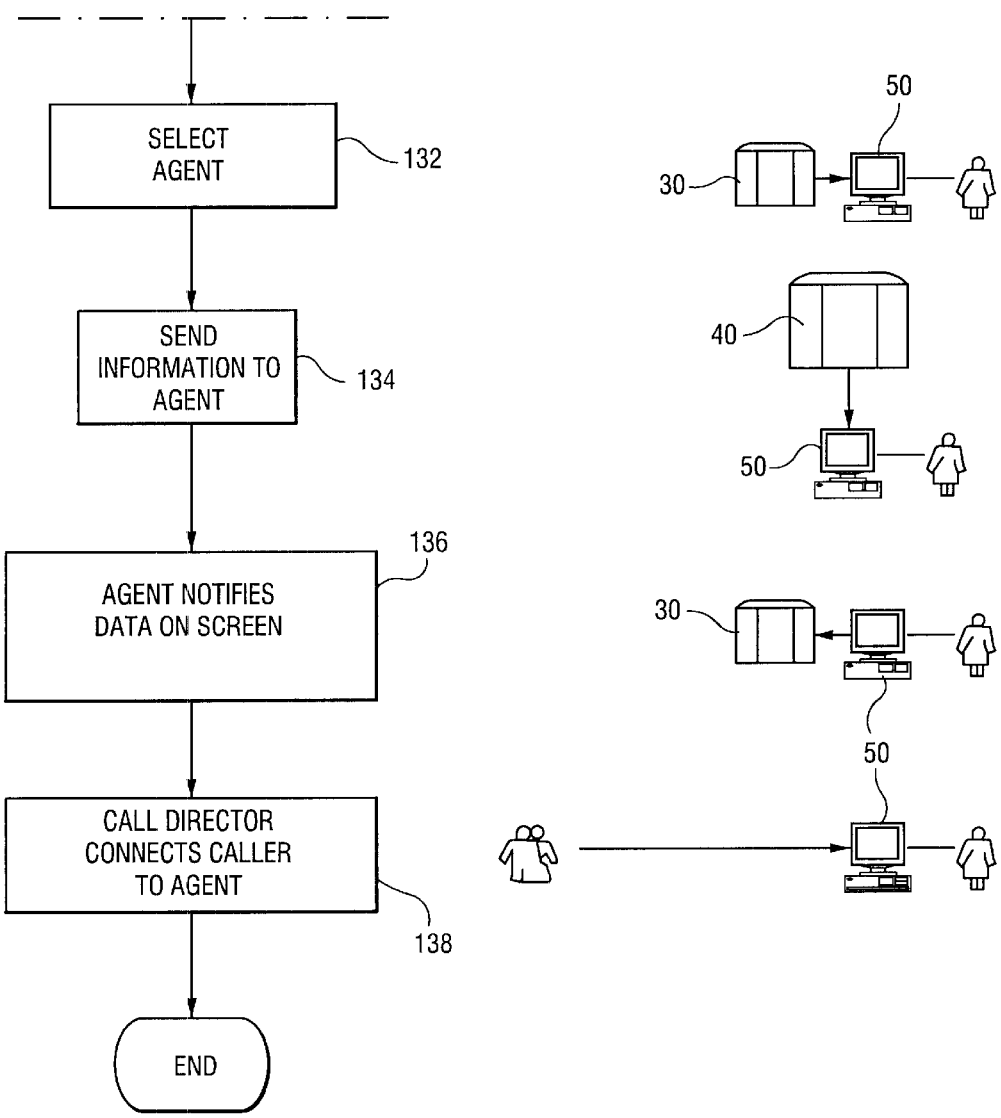
Figure 3A:
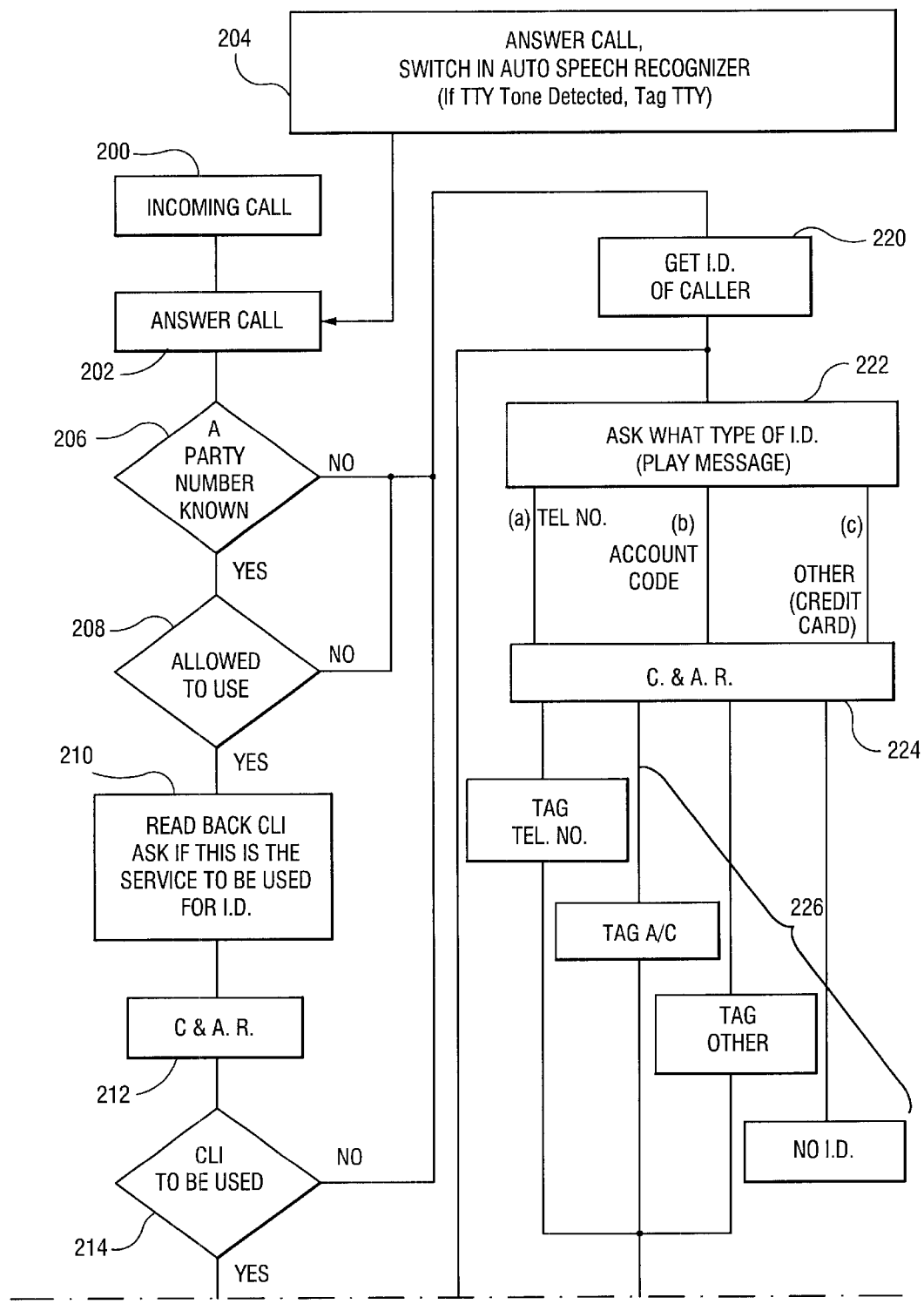
FIGS. 3a, 3b, 3c, and 3d are more detailed flow charts of a process by which a caller is interrogated by the call receiving means and then transferred to an appropriate remote destination.
Figure 3B:
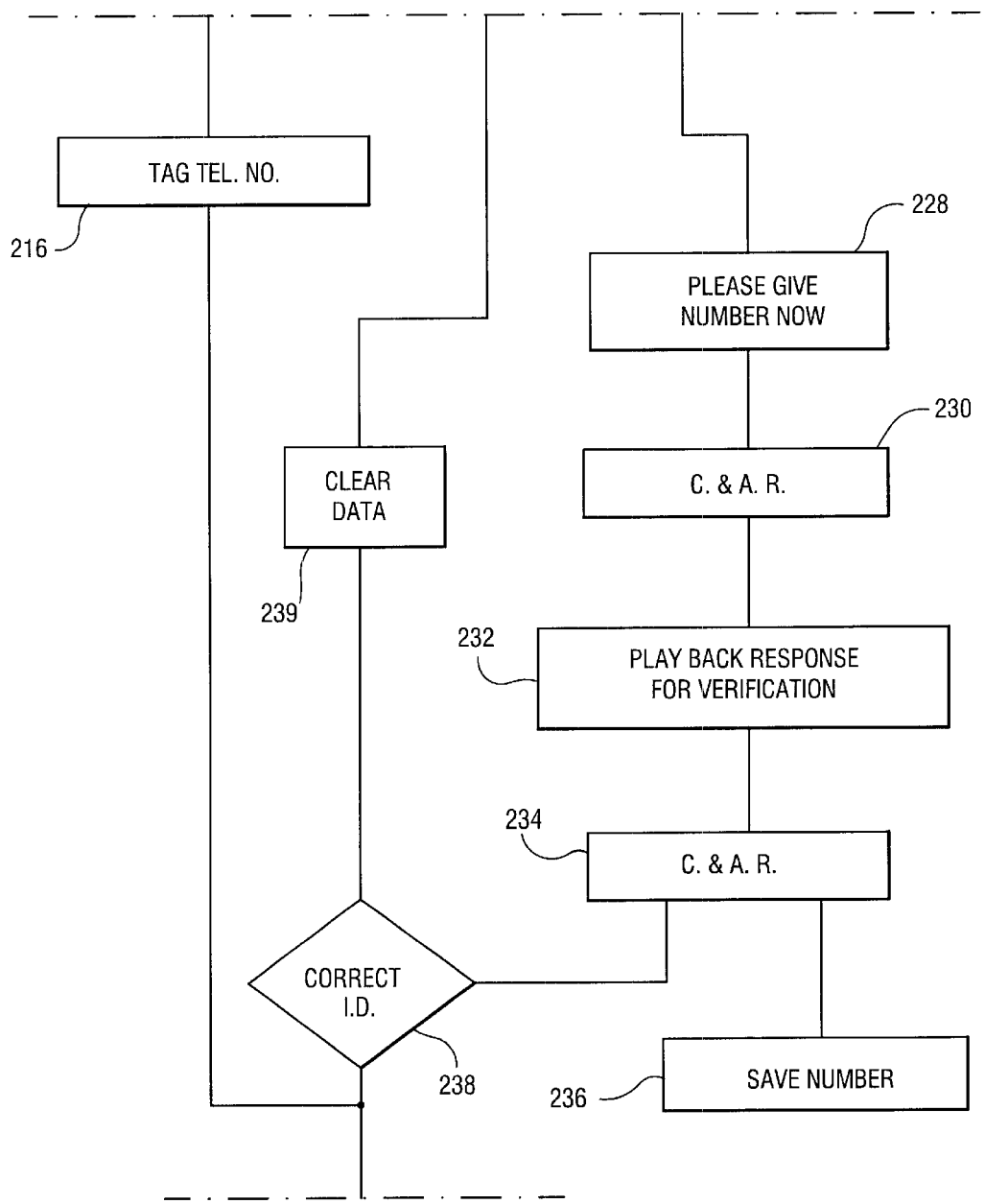
Figure 3C:
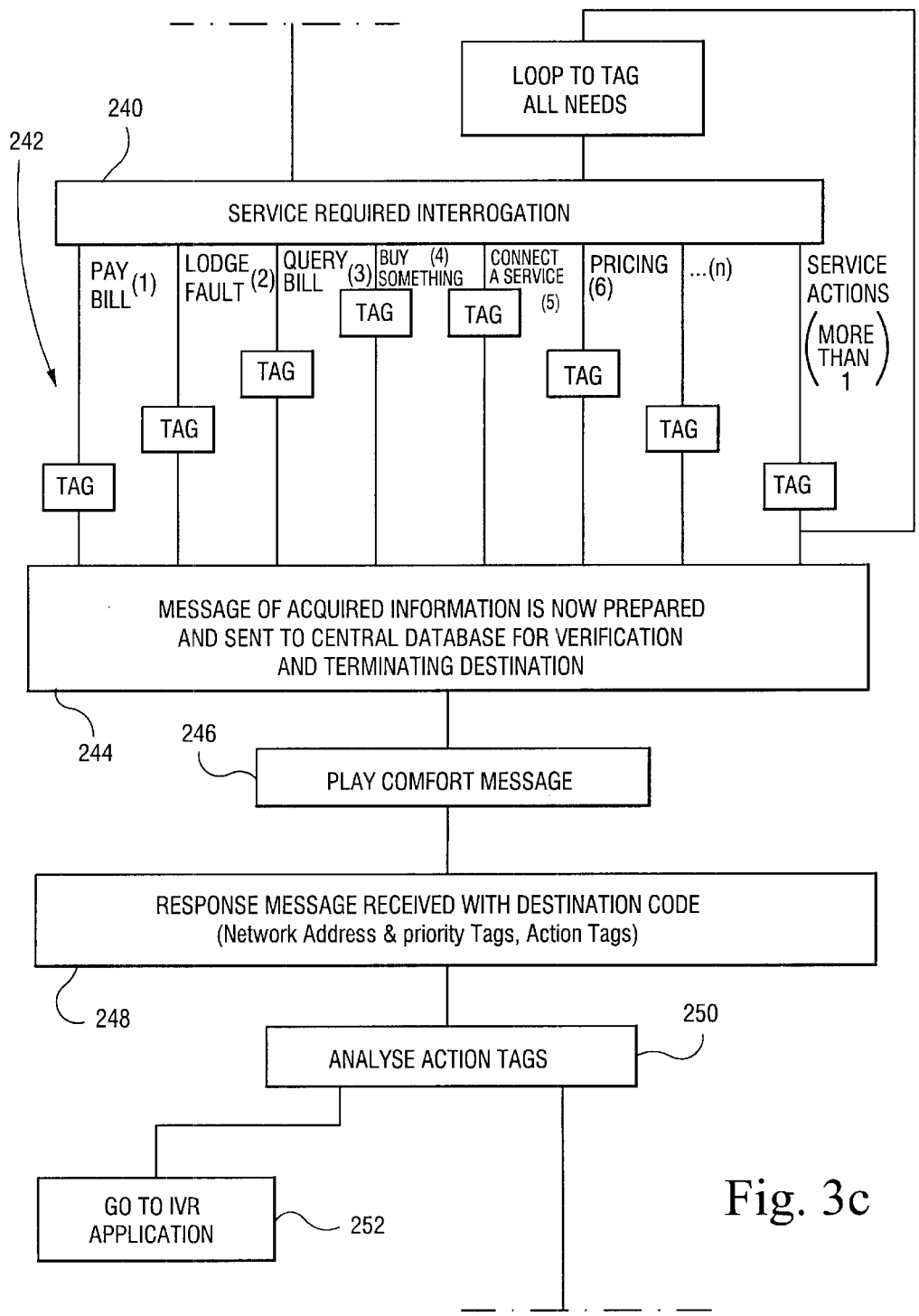
Figure 3D:
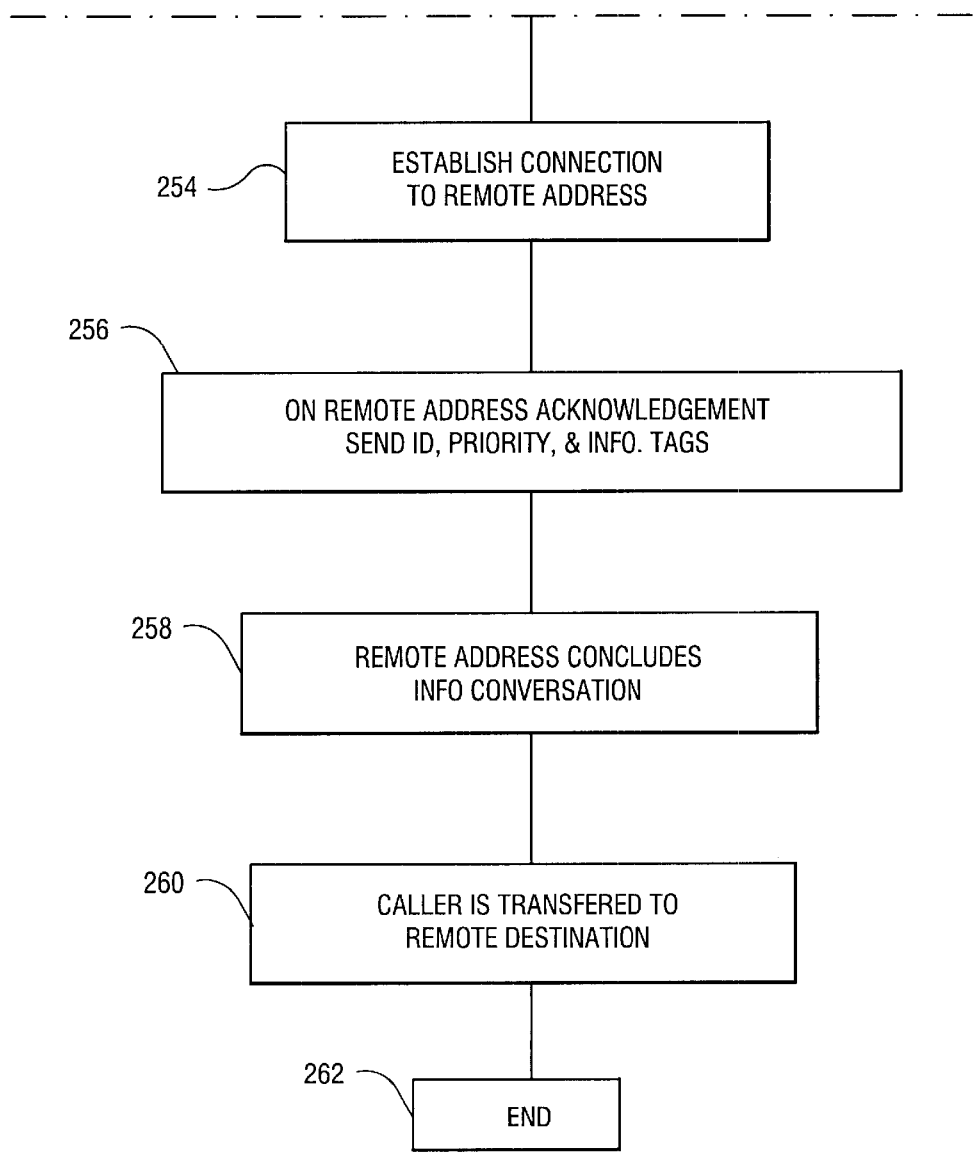

Referring to FIG. 2c, which continues from step 134 of FIG. 2b, the agent acknowledges receipt of the customer details on screen at step 136. The call processing center 30 then connects the customer call through to the agent at step 78 to enable the customer to talk directly with the agent.

An example of an automatic call distribution process which may be used by the call processing center in the present invention is described in pending U.S. patent application Ser. No. 08/534,199 entitled "Method and Apparatus for Automatic Call Distribution" filed Sep. 26, 1995 in the names of Sven G. J. Kilander and Christopher Sheahan, the contents of which are incorporated herein by reference.

The system and method of the present invention may be used for connecting customers to a wide variety of subscriber services including, for instance, bill payment services, enquiry and complaint services e.g. for one or more banking organizations, and telephone purchasing services.

Referring to FIGS. 3a, 3b, 3c and 3d, an incoming call received at the caller interviewer at 200 is answered by the caller interviewer at 202 and the caller interviewer switches in the automatic speech recognizer at 204 unless a teletypewriter (TTY) tone is detected when the call is answered. In the latter case, a teletypewriter response means is tagged or activated.

The caller interviewer is arranged at 206 to interrogate the caller to obtain calling line identification details identifying the caller or his or her telephone number and communicates with the customer service database to determine whether the caller is known. If the caller is known the caller interviewer checks with the customer service database whether the caller is allowed to use the system at 208. The interactive voice response means then reads back the calling line identification details and asks the caller at 210 to confirm that the identification details correspond to the particular service required. The automatic speech recognition means then captures and analyses the caller's response at 212 to determine whether the calling line identification is to be used for the particular service requested at 214.

The caller interviewer then tags the caller's telephone number or other identification details at 216.

If the caller is not known, or not allowed to use the system, or if the calling line identification is not to be used for the service required, the interactive voice response means requests the caller to provide further identification details at 220 and the type of identification details, e.g. telephone number, bank account number and credit card number, at step 222. The automatic speech recognition means again captures and analyses the caller's response at 224 and tags the identification details at 226. The interactive voice response means may request the caller to repeat the identification number at 228 and the caller's response is then again captured and analyzed at 230. The interactive voice response means may then playback the response at 232 for verification, and if the caller's response verifies the identification number when captured and analyzed at 234 it is then saved at 234 in the customer service database for future use.

The caller interviewer then checks at 238 whether correct identification details have been provided, and if the identification details have not been correctly provided and stored, the data is then cleared at 239 and the caller requested to provide identification details and type again at 222.

If the caller's identification details have been correctly provided and stored, the call receiving means interrogates the caller at 240 to determine the particular service required by the caller. Examples of services which may be provided by the system include: bill paying; fault notification; bill queries; purchasing services; price enquiries and servant actions. When the particular service required is identified, it is tagged at 242 and a message of acquired information, e.g. caller identification and service identification, is prepared at 244 and sent by the caller interviewer to the customer service database for verification and production of call destination data. While the acquired information is being verified, a comfort message or hold music may be played to the caller at 246.

When the caller interviewer receives at 248 a response message from the customer service database containing a destination code, priority tags and action tags, it analyses the action tags at 250 to determine whether it has suitable interactive voice procedures to handle the caller's request. In this case, the caller interviewer may be able to respond to the caller's request at 252 without the necessity of transferring the call to a remotely locality call destination or call handling agent.

If the call has to be sent to a remote destination, the call interviewer establishes a connection over the telephone network to the remote call processing center and sends remote address details to the call processing center at 254. When the call processing center acknowledges receipt of the remote address details, the call interviewer sends caller identification details, service information tags and priority data to the call processing center at 256. When all the caller identification details and service information tags have been received by the call processing center at 258, the call is transferred to the call processing center at 260 for distribution to an appropriate call handling agent in accordance with its automatic call distribution procedures. This concludes the involvement of the caller interviewer at 262.

Figure 4A:
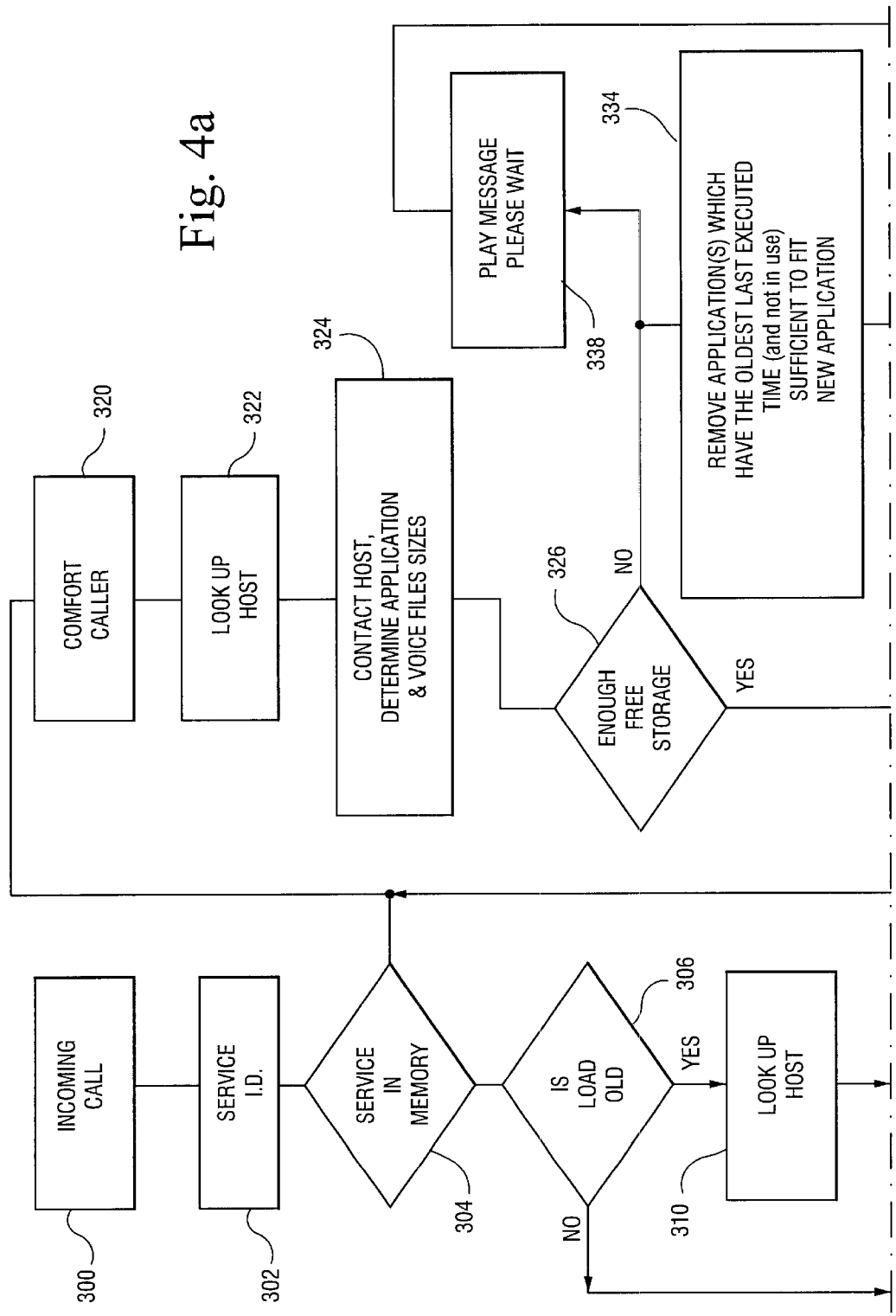
FIGS. 4a and 4b are further flow charts of a process for loading and updating interactive voice response files at the call receiving means.
Figure 4B:
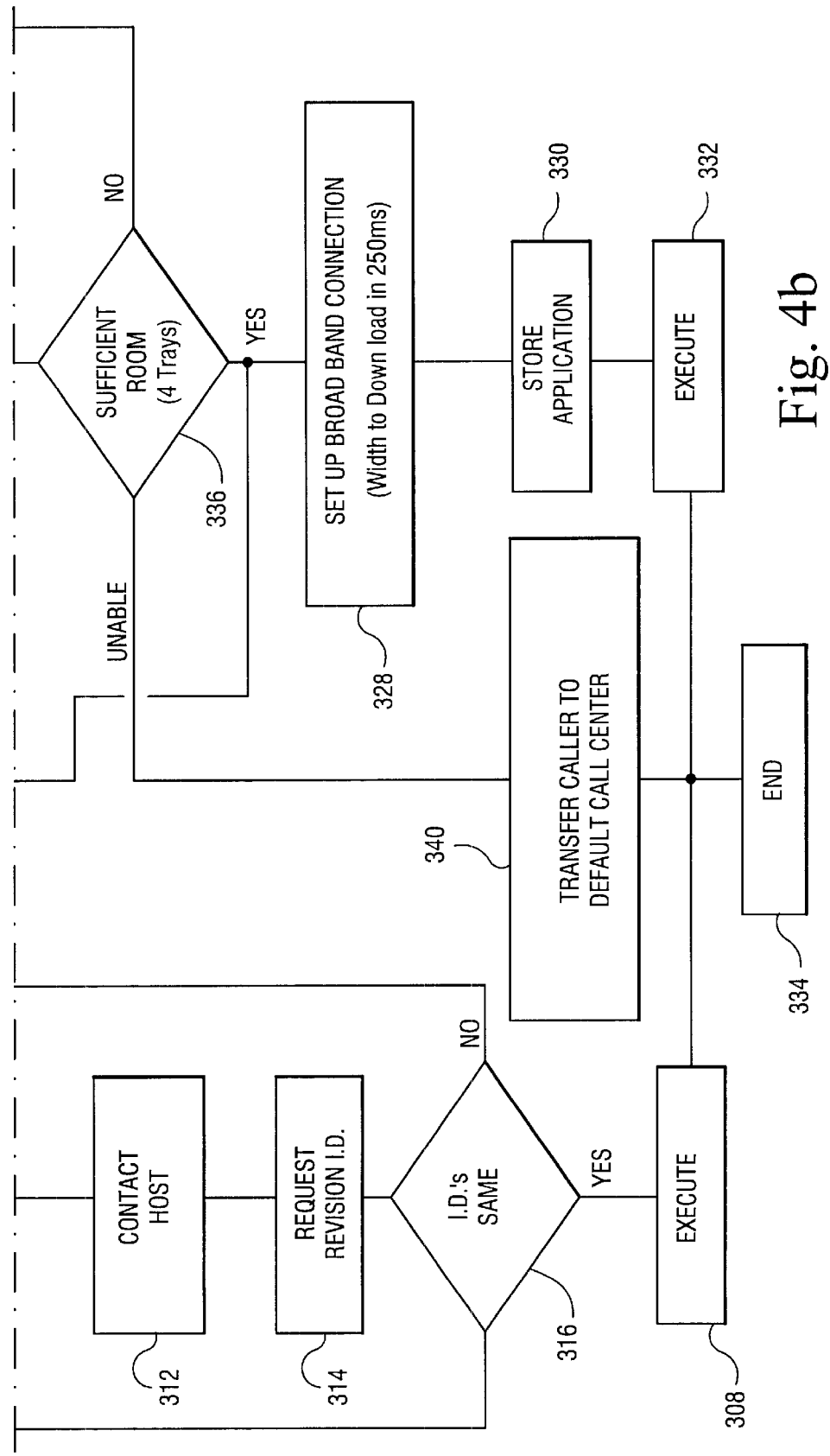

Referring to FIGS. 4a and 4b there is shown a flow chart of a process by which the interactive voice response files for particular services available in the system can be loaded and updated. When the caller interviewer receives an incoming call at 300 and has obtained service identification details identifying the service required at 302, the caller interviewer checks at 304 whether appropriate interactive voice response messages for responding to the caller's request are present in the memory in which the interactive voice response files are stored at the caller interviewer.

If the appropriate voice response messages are present, the caller interviewer checks at 306 whether the previously loaded voice response messages are "old". An "old" load means that the stored voice response message was loaded prior to the start of the current day or other update period. If the previously loaded voice response message is not "old", the voice response message can then be executed at 308.

If the previously loaded voice response message is "old", the caller interviewer looks up the customer service database or "host computer" at 310 and contacts the host computer at 312 to request revision of the voice response message and revised identification details (if any) for the requested service at 314. The caller interviewer then checks whether the service identification details have changed at 316, and if they are the same, the voice response message can then be executed at 308.

If the interactive voice response messages for the requested service are not in the memory, or if the service identification details have changed, hold music and/or comfort messages are played to the caller at 320 while the caller interviewer requests the customer service or host computer to create new recorded voice files for the interactive voice response means. In this case, the caller interviewer looks up the host computer at 322 and contacts the host computer at 324 to request the recorded voice response files or "application" to be created for the requested service. The memory in which the recorded voice files are stored is then checked at 326 to determine whether there is enough free storage in the memory for the newly created voice response file. If there is enough free storage, a broadband connection between the host computer and the caller interviewer is established at 328 and the newly created voice response file or application is transferred to the caller interviewer and stored in its memory at 330. The newly created voice response file can then be executed at 332.

If there is insufficient storage room in the memory, the voice file(s) or application(s) which have the oldest loading time or oldest time of last execution and which are not currently in use are removed at 334. The memory is then checked again for sufficient storage room at 336. If there is insufficient room, a comfort message, e.g. "please wait", is played to the caller at 338 while another voice file or application is removed from the memory at 334. The memory is checked again at 336 until either sufficient room is available or until a predetermined number of unsuccessful attempts, say four, have been made. In the latter case, the caller interviewer may transfer the caller to a default call center at 340. In the former case, when there is sufficient room for the newly created voice response file or application, the broadband connection is established at 328 and the new voice response file or application stored in the memory at 330. After the voice response file or application has been executed at 332, the process ends at 334.

As mentioned previously, the caller interviewer may be able to handle the request from a caller without having to transfer the call to a remote call processing center or call handling agent. In this case, the customer service database or "host computer" may contain the complete information necessary to handle the caller's request. By way of example, interactive response procedures at the caller interviewer may enable a caller to order an airline ticket as follows:

Question (Q): Do you require a Domestic or International flight?
Answer (A): Domestic
Q: Where do you want to go to?
A: Cairns
Q: Where do you want to leave from?
A: Broome
Q: On what date to you want to leave?
A: 6th September
Voice Response: Please Wait The interviewer now contacts the host computer to obtain information about the availability of flights from Broome to Cairns.

An example of the response may be:
(1) No direct;
(2) No flights out of Broome on 6th;
(3) Flights depart from Broome on 3rd, 7th or 8th;
(4) 3rd via Perth, Sydney, Brisbane
(5) 5th via Darwin
(6) 7th via Alice Springs, Brisbane.

This response may be played to the caller by the interactive voice response means followed by the question.
Q: Which One—3rd, 5th or 7th?
A: 7th
Q. How do you want to pay, Direct Debit or Credit Card?
A. Direct Debit
Q. Name of Banking Organization?
A. Advance
Q. Account No.?
A. 4432-33-6744
Q. PIN?
A. 7736

The caller interviewer may also include an automatic text to speech (ATS) module in addition to the automatic speech recognition (ASR) means which allows an interactive voice response application to be developed at the caller interviewer in response to text messages generated at the customer service computer or "host computer".

It will be appreciated that various other modifications and/or additions may be made to the system and method described above without departing from the scope or spirit of the present invention.

What is claimed is:

1. A telecommunications system for connecting callers in a telecommunications network to a plurality of call destinations providing different services for the callers, comprising:
   a call receiving node to receive telephone calls from callers, said call receiving node including an interactive response unit adapted to interrogate a caller to determine caller and service information identifying the caller and the type of service required by the caller, and adapted to determine an appropriate call destination for each call; and
   a remotely located call processing center adapted to communicate remotely with the call receiving node and arranged to receive and process the caller and service information received from said call receiving node thereby acting to liberate the call receiving node for other incoming telephone calls while the call processing center connects a telephone call, forwarded from the call receiving node, to an appropriate call destination for the service required by the caller as determined by the processing, within the call processing center, of said received caller and service information.

2. A telecommunications system according to claim 1, wherein the interactive response unit of the call receiving node is arranged to communicate with a customer service database when interrogating a caller to determine whether or not the type of service required by the caller is available to be accessed from the call processing center.

3. A telecommunications system according to claim 1, wherein the data and the caller and service information are sent from the call receiving node to the remote call processing center over a telecommunications network.

4. A telecommunications system according to claim 1, wherein the interactive response unit comprises an interactive response device which recognizes text messages generated by a teletypewriter (TTY) and which provides response messages using TTY codes.

5. A telecommunications system according to claim 1, wherein the interactive response unit comprises an interactive voice response module containing pre-stored voice response messages and internal programs for generating appropriate voice response messages to interrogate a caller.

6. A telecommunications system according to claim 5, wherein the interactive voice response module is arranged to recognize dual tone modulation frequency (DTMF) coded messages produced by a touch telephone in reply to pre-recorded voice questions generated by the interactive voice response modules.

7. A telecommunications system according to claim 5, wherein the call receiving node further includes an automatic speech recognition module arranged to recognize a caller's speech replies to the interactive voice response module and wherein the voice response messages are generated by the interactive voice response module in response to the voice replies from the caller which are recognized by the speech recognition module.

8. A telecommunications system according to claim 1, wherein the call processing center includes an automatic call distributor adapted to transfer telephone calls received from the call receiving node to appropriate call handling agents of a service provider as determined by the processing of said received caller and service information.

9. A telecommunications system according to claim 1, wherein the call processing center includes, or is in communication with, at least one customer information database, associated with a service provider, containing information about customers of the service provider, and the call processing center is arranged to retrieve information about a customer from the customer information database prior to or simultaneously with the call processing center forwarding the telephone call to an appropriate call destination.

10. A telecommunications system according to claim 1, wherein the call receiving node includes, or is adapted to communicate with, a customer service database containing service data identifying the services of particular service providers, which services are available to be accessed from the call processing center.

11. A telecommunications system according to claim 1, wherein the call receiving node further includes an automatic speech recognition module arranged to recognize a caller's speech replies to the interactive voice response module.

12. A telecommunications apparatus comprising:
- a call receiving node to receive a telephone call from a caller including:
  - (i) an interactive voice response module adapted to interrogate the caller to determine caller and service information identifying the caller and the type of service required by the caller,
  - (ii) an automatic speech recognition module arranged to recognize a caller's speech responses to the interactive voice response module; and
  - (iii) an interface adapted to communicate with a remotely-located call processing center for forwarding said caller and service information to said call processing center where the call processing center connects the telephone call, forwarded from the call receiving node, to an appropriate call destination for the service required by the caller as determined by processing, within the call processing center, said forwarded caller and service information thereby acting to liberate the call receiving node for other incoming telephone calls.

13. A telecommunications system apparatus according to claim 12, wherein the call receiving node is connected to a customer service computer.

14. A telecommunications system according to claim 13, wherein the customer service computer contains a database of service data identifying the services of a plurality of service providers.

15. A telecommunications system or apparatus according to claim 13, wherein the customer service computer includes an automatic speech recognition program or an interactive voice response program and one or more messages which correspond to particular services available for downloading to the call receiving node.

16. A telecommunications system according to claim 13, wherein the customer service computer includes information about services which can enable the call receiving node to handle service requests from callers without having to first transfer the calls to the remote call processing center.

17. A telecommunications system according to claim 13, wherein the customer service computer is located remotely from the call receiving module so that an automatic speech recognition program or an interactive voice response program and one or more messages used at the call receiving node can be remotely loaded and remotely updated and adjusted from the customer service computer.

18. A telecommunications system according to claim 13, wherein the call receiving node may communicate with the remotely located customer service computer by a datalink, wherein the datalink is a switched broadband access link.

19. The telecommunications system of claim 18, wherein the datalink is a broadband access link.

20. A method for connecting a caller in a telecommunications system to one of a plurality of call destinations providing different services, said method comprising:
- receiving an incoming telephone call from a caller at a call receiving node;
- interrogating the caller by interactive response procedures to determine caller and service information about the caller and a type of service required by the caller;
- forwarding the telephone call and the caller and service information to a remotely-located call processing center;
- receiving and processing the forwarded caller and service information at the call processing center, thereby acting to liberate the call receiving node for other incoming telephone calls; and
- connecting the telephone call, forwarded by the call receiving node to the call processing center, to an appropriate call destination in accordance with the processing of the caller and service information.

21. A method for connecting a caller in a telecommunications system to one of a plurality of call destinations providing different services, said method comprising:
- receiving an incoming telephone call from a caller at a call receiving node;
- interrogating the caller by interactive voice response procedures using automatic speech recognition to determine caller and service information identifying the caller's identity and the type of service required by the caller;
- forwarding the caller and service information to a remotely-located call processing center;
- receiving and processing the forwarded information at the call processing center, thereby acting to liberate the call receiving node for other incoming calls; and
- connecting the call, forwarded by the call receiving node to the call processing center, to an appropriate call destination in accordance with the processing of the caller and service information.

* * * * *